United States Patent

[11] 3,633,168

[72] Inventors Roy C. Dixon;
Larry J. Hash; Robert F. Steen, all of Raleigh, N.C.
[21] Appl. No. 122,370
[22] Filed Mar. 9, 1971
[45] Patented Jan. 4, 1972
[73] Assignee International Business Machines Corporation
Armonk, N.Y.

[54] LINE CONTROL ADAPTER FOR A SYNCHRONOUS DIGITAL-FORMATTED MESSAGE-COMMUNICATIONS SYSTEM
7 Claims, 3 Drawing Figs.

[52] U.S. Cl. .......... 340/167 R, 340/147 R, 340/150
[51] Int. Cl. .......... H04q 9/00
[50] Field of Search .......... 340/167, 147, 150, 172.5

[56] References Cited
UNITED STATES PATENTS
3,332,068 7/1967 McLaughlin et al. .......... 340/172.5

*Primary Examiner*—Donald J. Yusko
*Attorneys*—Hanifin and Jancin and Robert B. Brodie

ABSTRACT: A line adapter interposed between a terminal generating formatted digital messages and a transmission line, the message format containing control characters for activating some but not all of a plurality of commonly communicating terminals. The adapter includes means for continuously detecting control characters used by its corresponding terminal when in the receive mode, and means for selectively altering chance data resembling control characters into noncontrol characters when in a transmit mode. Consequently, remote receiving terminals normally responsive to the control character code through their associated adapter fail to recognize the control character and remain off line.

TD - TRANSMITTED DATA
RD - RECEIVED DATA
RC - RECEIVED CLOCK
TC - TRANSMITTED CLOCK
CTS - CLEAR TO SEND

INVENTORS
ROY C. DIXON
LARRY J. HASH
ROBERT F. STEEN

BY Robert Bruce Brodie
ATTORNEY

LINE CONTROL ADAPTER FOR A SYNCHRONOUS DIGITAL-FORMATTED MESSAGE-COMMUNICATIONS SYSTEM

BACKGROUND OF THE INVENTION

This invention relates to digital data-transmission systems, and more particularly to synchronous systems using formatted messages.

Broadly, it is known from the time-multiplexor art to electrically communicate to selected ones of a plurality of remote terminals over a common communications path. It is further known that addressing specific terminals can be accomplished by way of special address codes. In asynchronous systems such as the radio system described in u.S. Pat. No. 3,403,381 to R. B. Haner, a totally analog scheme of pulse spacing and pulse width modulation is used to define and transmit to remote terminal addresses and control characters. In contrast, the requisites of a synchronous and digital communications system require a resort to digital coding and coding apparatus to achieve a "talking path connection" between a terminal transmitting in one code and only those terminals adapted to receive the same code.

Communication links, such as high-speed telephone lines, are expensive to install and maintain or lease from a common carrier. Naturally, this directs interest to sharing such expensive facilities among a number of different digitally activated terminals or groups of terminals. Differences in terminals import difference in their digital codes. In particular, the prospect occurs that a control character in one code may be interpreted as a data or noncontrol character in another code and vis a vis. This suggests that terminals operating under different codes could and would play considerable havoc on their common communications path. Illustratively, synchronous line control requires that the digital message format include a control character reserved for message framing or character synchronization. It is then likely that terminal 1 responsive to a control character 0111 may synchronize on a data character 0111 in another code.

SUMMARY OF THE INVENTION

The above-mentioned problem is satisfied in an embodiment of a synchronous digital-formatted message-communications system in which a control element or line adapter is interposed between each remote terminal and the common communications path. Each control element includes means for continuously detecting control characters used by its corresponding terminal, when in a receive mode; and means for selectively altering control characters into noncontrol characters when in a transmit mode. Consequently, remote receiving terminals normally responsive to the control character code through their associated adapter fail to recognize the control character and remain off-line.

A synchronous digital-formatted message-communications system ordinarily uses control characters to prefix and suffix a data stream. As previously suggested, message framing and character synchronization are frequent, necessary, and continuously recurring control characters. The desired object is to make either different terminals or groups of terminals selectively transparent to certain control characters where at least two terminals are responsive to differently coded characters. In this regard, the invention more particularly contemplates using the message framing or character sync characters.

DESCRIPTION OF THE PREFERRED EMBODIMENT

Figure 1:
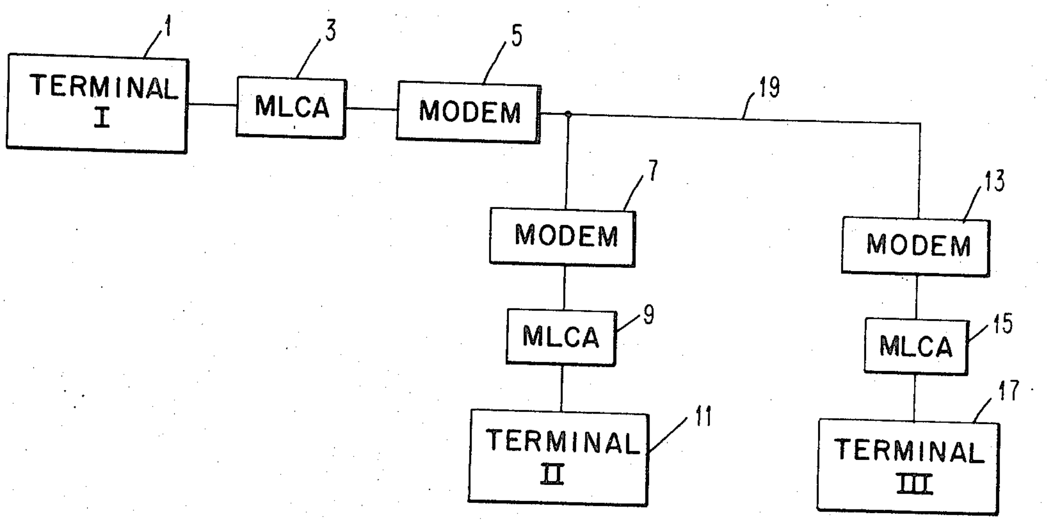
FIG. 1 shows the adapter interposed between each terminal and the modem coupling the common communications path.

Referring now to FIG. 1, there is shown a plurality of adapters 3, 9 and 15 respectively interposed between corresponding terminals 1, 11, and 17 and the modems 5, 7, and 13 coupling the common communications path 19. The data format includes two control characters bounding a data stream, i.e., $$\begin{pmatrix}S\\Y\\N\end{pmatrix}_i - \text{DATA} - \begin{pmatrix}E\\O\\B\end{pmatrix}_i \text{ where } \begin{pmatrix}S\\Y\\N\end{pmatrix}_i \text{ and } \begin{pmatrix}E\\O\\B\end{pmatrix}_i \text{ are}$$

respectively the sync character and end of block character in the $i^{th}$ code. Thus, assume that Terminals II and III are respectively responsive to control characters in the $i^{th}$ and $j^{th}$ codes, and that Terminal I is going to communicate to Terminal II.

Figure 2:
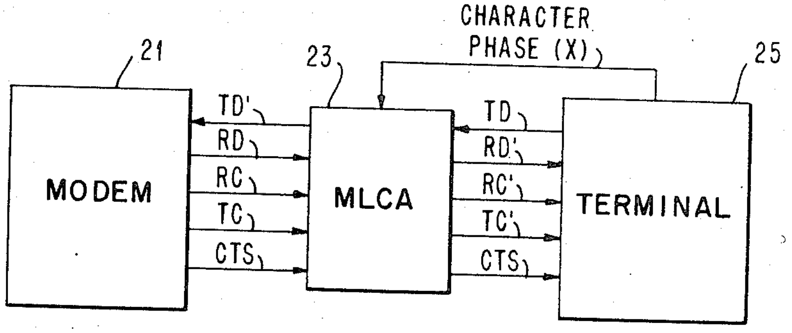
FIG. 2 illustrates the control line direction and connections among the adapter, terminal, and modem.

Referring no to FIG. 2 taken together with FIG. 1 of the drawing, the terminal will activate the modem 21 and the adapter 23 by setting the X lead. Terminal I will generate $$\begin{pmatrix}S\\Y\\N\end{pmatrix}_i$$

characters as 10010110 and this is not altered by the adapter. However, all chance data characters of the form $$\begin{pmatrix}S\\Y\\N\end{pmatrix}_i \text{(e.g. 00110010)}$$

will be altered to $$\begin{pmatrix}S\\Y\\N\end{pmatrix}'_i$$

by masking and bit insertion (010110010). This term will not be recognized by Terminal III as its sync character. Furthermore, the adapter 9 associated with Terminal II will decode $$\begin{pmatrix}S\\Y\\N\end{pmatrix}'_i$$

back to the intended data pattern before passing it to the terminal. Upon receipt of the end of block character $$\begin{pmatrix}E\\O\\B\end{pmatrix}_i$$

Terminal II will set the X lead in adapter 9 while Terminal I will reset the X lead in adapter 3 and both will signal their modems to cause a reversal of the direction of the transmission path.

Terminal II will then respond to Terminal I in the $$\begin{pmatrix}S\\Y\\N\end{pmatrix}_i - \text{DATA} - \begin{pmatrix}E\\O\\B\end{pmatrix}_i$$

Any chance data characters similar to $$\begin{pmatrix}S\\Y\\N\end{pmatrix}'_i$$

are translated by adapter 9 and retranslated to the original configuration by adapter 3. After sending $$\begin{pmatrix} E \\ O \\ B \end{pmatrix}_i$$

Terminal II will reset the X lead on its adapter. After receiving $$\begin{pmatrix} E \\ O \\ B \end{pmatrix}_i \cdot \text{ Terminal}$$

I is ready to initiate a new transmission.

The altering of data appearing as the undesired sync characters may utilize the insertion of single bits following specific bit patterns. This translation function may be more fully appreciated by reference to FIG. 3.

Figure 3:
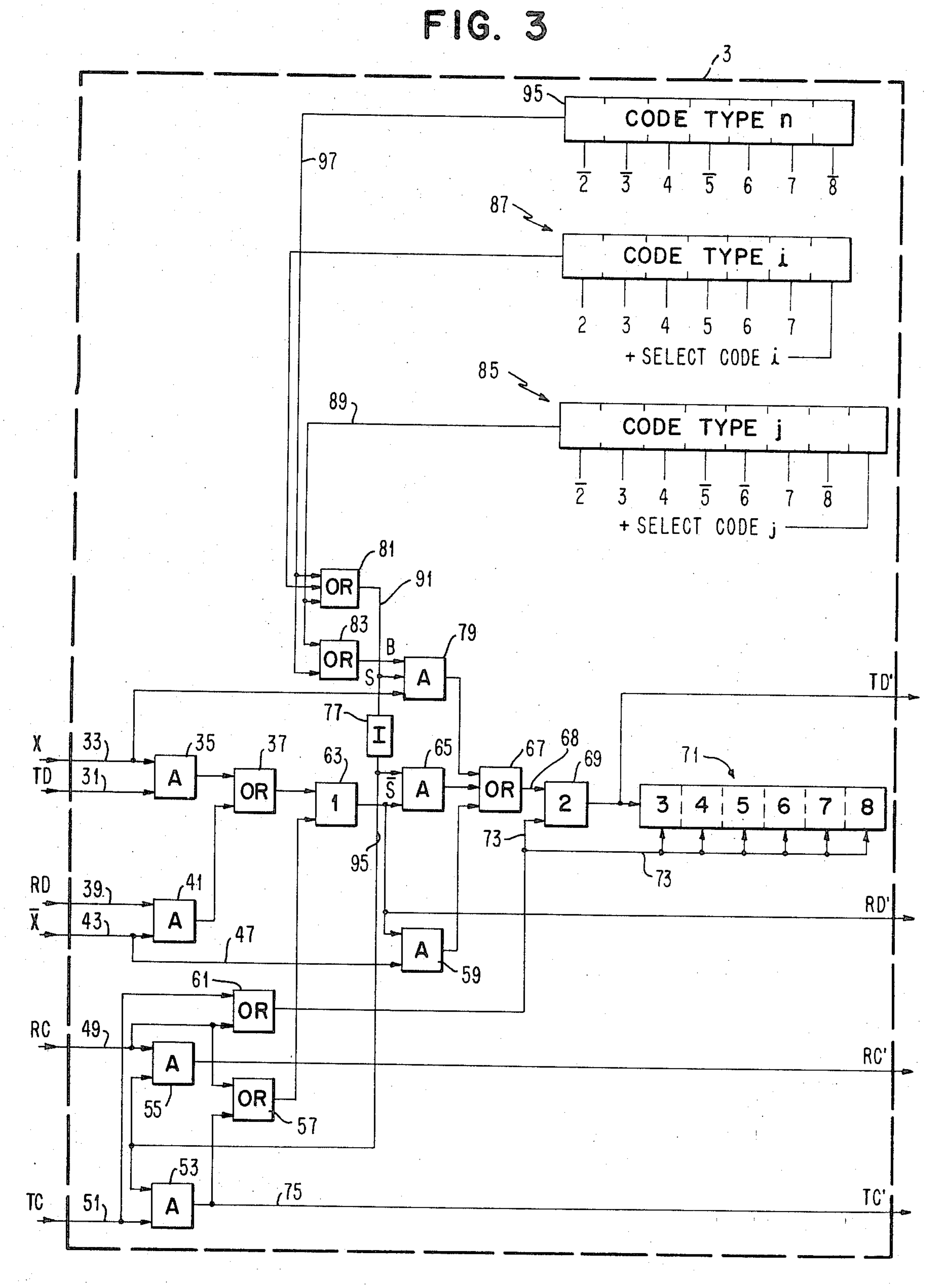
FIG. 3 exhibits the detailed logical design of one illustrative embodiment of the adapter.

In FIG. 3 digital control characters may be stored in their respective codes *i* and *j* in corresponding registers 87 and 85. Upon a terminal being in a transmit mode, the terminal activates the X input 33 enabling AND-gates 35 and 79, and applies data (TD) on line 31. The terminal or the adapter may also apply clocking (TC) on path 51.

Flip-flops 63, 69 and 71 are arranged in cascade to form a shift register having stages 1 through 8. The data pulses are serially loaded into the shift register and flow from stage one, being progressively shifted each clock time, to the next successive stage. Assuming that it is desired to convert data appearing identical to a control character in the *j* code into a noncontrol character when the contents in register stages 2 through 8 match the contents of register 85, then a zero or one is inserted into register stage 2 to break up the data sequence.

In register 85, the contents of the register stages 2 through 8 of the *j* code character are respectively 0110010. The logic for effectuating the comparison is not shown. However, upon the occurrence of an identity match, a signal is impressed on path 89 activating AND-gate 79 through OR-gates 81 and 83 and X INPUT 33. At the same time the clock input TC is interrupted because AND-gate 53 becomes disabled through inverter 77 on path 93. Also, AND-gate 65 becomes disabled.

It may be recalled that for this example in order for an identity to occur, the contents of register 85 stage 2 (0) must be the same as that of flip-flop 69 (0). This match condition is altered by shifting the contents of register stage 69 to the next successive stage and inserting a bit into register stage 69. Now, flip-flop 69 has the clock signal impressed on input 73 and a signal on input 68 through AND-gate 79 and OR-gate 67, the truth table for the typical D flip-flop, see "Logical Design for Digital Computers" by Montgomery Phister, John Wiley and Sons, New York, 1958, L.C. 58-6082 at page 126 appears as follows:

| $D^n$ | $Q^{n+1}$ |
|---|---|
| 0 | 0 |
| 1 | 1 |

Therefore, $Q^{n+1}=D^n$. Thus, when the D input at time *n* is 1, then the output Q at time *n*+1 is 1.

In view of the shift of the contents and bit insertion in flip-flop 69, there no longer is an identity. AND-gate 79 is disabled; AND-gates 53 and 65 becoming enabled. Data can now be clocked through again.

When operating in the receive mode, the adapter removes any bits inserted by the transmitter adapter. In this mode, the X input is activated thereby enabling gates 41 and 59 on path 43. Data is inserted on the RD input 39 and routed to shift register flip-flops 63, 69, and 71 through gates 41 and 37. A clock pulse (RC) is applied on line 49 each time a new data bit is present on the RD lead. The contents of the shift register 63, 69, 71 are compared (logic not shown) with the contents of say register 95. An identity will result in a signal on path 97 disabling the RC clock at gate 55 through the path including OR-gate 81, path 91, inverter 77 and path 93. The clock signal RC′ being interrupted permits the contents of flip-flop stage 69 to be shifted to the next successive stage and a bit inserted therein. This results in a mismatch between the contents of register 69, 71 and register 95.

This description of the present invention has been given as an example and it will be understood that various changes in form and details may be made therein without departing from the spirit and scope of the invention.

What is claimed is:

1. In a digital data-communications system having a plurality of terminals coupling a common communications path, at least two of the terminals being responsive to control characters expressed in different codes; wherein the system further includes:

coupling means being interposed between a first terminal and the path, the coupling means comprising:

means for continuously monitoring the data stream being generated by the first terminal, and for providing signal indication that a selected set of the monitored data stream corresponds to control characters expressed in a code different from that used by the first terminal; and means responsive to the signal indication for inserting a data element into the set sequence thereby converting the set sequence into a noncontrol character.

2. In a digital data-communications system according to claim 1, wherein the system further includes:

another coupling means interposed between a second terminal and the path, said second terminal being responsive to control characters expressed in the code used by the first terminal, the coupling means comprising:

means for continuously monitoring the data stream generated by the first terminal and for providing signal indication that a selected set of the monitored data stream corresponds to the noncontrol character; and means responsive to the signal indication for removing the inserted data element from the monitored data set.

3. In a digital data-communications system according to claim 1, wherein the coupling means further include:

means responsive to clocking signals from the first terminal for sequencing the data stream therethrough; and means responsive to the signal indication for interrupting the sequencing means for a time duration at least sufficient to insert the data element.

4. In a digital data-communications system according to claim 2, wherein the coupling means interposed between the second terminal and the path further include:

means responsive to clocking signals accompany the data stream for sequencing the received data stream therethrough; and means responsive to the signal indication for interrupting the sequencing means for a time duration at least sufficient to remove the inserted data element.

5. In a digital data-communications system in which transmitted control characters define message framing, data character synchronization and the like, the system having:

a common communications path;

a plurality of terminals, at least one terminal being responsive to control characters expressed in a first code, and another terminal being responsive to control characters expressed in a second code; and means for coupling each terminal to the common communications path; wherein the coupling means include:

means for monitoring the data stream being generated by a terminal expressing control characters in the first code; and means for altering that monitored data which appears as control characters expressed in the second code into non-control characters.

6. In a digital data-communications system according to claim 5, wherein;

the means for monitoring the data stream include;

memory means containing control characters expressed in the second code; and means for providing signal indication of a comparison match between a set from the data stream and the contents of the memory means;

the means for altering that monitored data include:

means responsive to the signal indication for inserting a data element into the set sequence such that the set sequence mismatches the memory contents.

7. In a digital data-communications system having a plurality of terminals coupling a common communication path, at least two of the terminals being responsive to control characters expressed in different codes, wherein the system includes:

coupling means interposed between each terminal and the communications path, the coupling means comprise:

means for sequencing a data stream either generated by the associate terminal and applied to the path or received from the path;

means for providing a first signal indication of a comparison match between a generated specified data sequence and a control character expressed in a code not used by the associate terminal;

means responsive to the first signal indication for interrupting the sequencing means and inserting a data element such that the specified data sequence mismatches the compared control character;

means for providing a second signal indication of a comparison match between a received specified data sequence and an arbitrary coded pattern; and means responsive to the second signal indication for removing at least one data character from the received sequence such as to create a mismatch between the sequence and the arbitrary pattern.

* * * * *